(12) United States Patent
Kim et al.

(10) Patent No.: US 7,975,178 B2
(45) Date of Patent: Jul. 5, 2011

(54) MEMORY DEVICE AND SYSTEM WITH CYCLIC, ECC-CORRECTED BOOTLOADING OPERATION DURING VOLTAGE BRING UP

(75) Inventors: Chang-Rae Kim, Yongin-si (KR); Pyung-Moon Zhang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 308 days.

(21) Appl. No.: 12/208,565

(22) Filed: Sep. 11, 2008

(65) Prior Publication Data
US 2009/0077423 A1 Mar. 19, 2009

(30) Foreign Application Priority Data
Sep. 19, 2007 (KR) .......... 10-2007-0095404

(51) Int. Cl.
G06F 11/00 (2006.01)
G06F 11/22 (2006.01)
(52) U.S. Cl. .......... 714/36; 714/718; 714/723
(58) Field of Classification Search .......... 714/36, 714/718, 723
See application file for complete search history.

(56) References Cited

U.S. PATENT DOCUMENTS

| | | | | |
|---|---|---|---|---|
| 5,075,642 A | * | 12/1991 | Learned | 331/143 |
| 5,247,659 A | * | 9/1993 | Curran et al. | 713/1 |
| 6,081,892 A | * | 6/2000 | Lomas | 713/2 |
| 6,118,336 A | * | 9/2000 | Pullen et al. | 330/10 |
| 6,333,652 B1 | * | 12/2001 | Iida et al. | 327/161 |
| 6,467,047 B1 | * | 10/2002 | Scaringella et al. | 714/6.2 |
| 7,219,221 B2 | * | 5/2007 | Chao | 713/2 |
| 7,308,567 B2 | * | 12/2007 | Yamamoto et al. | 713/1 |
| 2002/0095619 A1 | * | 7/2002 | Marsh | 714/23 |
| 2003/0056107 A1 | * | 3/2003 | Cammack et al. | 713/189 |
| 2004/0250058 A1 | * | 12/2004 | Chao | 713/2 |
| 2006/0062046 A1 | * | 3/2006 | Babudri et al. | 365/185.09 |

FOREIGN PATENT DOCUMENTS

| | | |
|---|---|---|
| JP | 2006221807 A | 8/2006 |
| KR | 1020050031399 A | 4/2005 |
| KR | 1020050108637 A | 11/2005 |
| KR | 1020070003808 A | 1/2007 |

* cited by examiner

Primary Examiner — Scott T Baderman
Assistant Examiner — Joseph Schell
(74) Attorney, Agent, or Firm — Volentine & Whitt, PLLC (57) ABSTRACT

Provided are a semiconductor memory device, memory system and method of executing a bootloading operation. The method includes cyclically executing a bootloading operation cycle that includes loading the boot information from the memory to the controller, and performing an ECC operation on the boot information. The ECC operation provides a fail condition indication or a pass condition indication and if the fail condition indication is provided, the next bootloading operation cycle is executed.

18 Claims, 7 Drawing Sheets

Fig. 7

MEMORY DEVICE AND SYSTEM WITH CYCLIC, ECC-CORRECTED BOOTLOADING OPERATION DURING VOLTAGE BRING UP

CROSS-REFERENCE TO RELATED APPLICATIONS

This U.S. non-provisional patent application claims priority under 35 U.S.C. §119 to Korean Patent Application No. 10-2007-0095404 filed on Sep. 19, 2007, the subject matter of which is hereby incorporated by reference.

BACKGROUND

The present invention relates to a semiconductor memory device, and more particularly, to a semiconductor memory device with safe bootloading and bootloading method.

Semiconductor memory devices may be classified into volatile memory devices, such as the dynamic random access memory (DRAM) and static random access memory (SRAM), and non-volatile memory devices, such as the programmable read-only memory (PROM), erasable programmable read-only memory (EPROM), electrically erasable programmable read-only memory (EEPROM), and ferroelectric random access memory (FRAM). Volatile memory devices lose stored data when power is interrupted, but non-volatile memory devices retain stored data under such conditions.

Non-volatile memory devices, and especially flash memory, are extensively used in a variety of applications. In addition to the non-volatile nature of their data storage capabilities, flash memory also offers such performance advantages as fast programming speed and low power consumption. As a result, flash memory is commonly used in (e.g.,) computer systems to store basic input/output system (BIOS) information and related boot code.

That is, flash memory typically includes a so-called boot block (i.e., a defined block of memory) storing such information as BIOS code data, boot code, associated password(s), etc., (hereafter, collectively or individually referred to as "boot information"). Hence, the boot block is a region first accessed by a host upon flash memory (or memory system) power-up. Erase and program operations are more frequently applied to the boot block than other memory blocks storing ordinary data in the flash memory.

Thus, soon after a power supply voltage Vcc is applied, the host accesses the boot information necessary for system initialization. However, bringing up (generating power supply voltage Vcc through it full swing) and applying power supply voltage Vcc within the system may take as long as hundreds of μseconds. Accordingly, the boot information may be read from flash memory as the power supply voltage Vcc is being brought up, and therefore below a minimum operating threshold associated with the power supply voltage Vcc. Such an occurrence may result in a boot operation error, since the read operation directed to the boot information is performed at an insufficient voltage. Obviously, a boot operation error will prevent proper system initialization.

To preclude the possibility of a boot operation error, boot information is loaded (i.e., read and transferred) from the flash memory only after a predetermined delay (e.g., about 300 μsec) following system initialization. An oscillator in the flash memory is typically used to generate the clock signal measuring this delay. However, each time the system is initialized, the full swing period associated with bringing up power supply voltage Vcc varies. Thus, even when a predetermined delay is accurately measured by an oscillator (or some similar circuit) resident on the flash memory, the stability of the boot information loading process (hereafter, "bootloading") can not be assured.

SUMMARY

Embodiments of the invention provide a semiconductor device and associated method of operation capable of stably loading boot information upon system initialization.

In one embodiment, the invention provides a semiconductor memory device comprising; a memory configured to store boot information, and a controller comprising an error detection and/or correction (ECC) circuit and being configured to execute a bootloading operation, wherein the bootloading operation comprises at least one bootloading operation cycle, and each bootloading operation cycle comprises loading the boot information from the memory and thereafter performing an ECC operation in the ECC circuit in relation to the loaded boot information, wherein the controller is further configured to execute a next bootloading operation cycle if the ECC operation indicates a fail condition for the loaded boot information.

In another embodiment, the invention provides a method of executing a bootloading operation in a memory system including a semiconductor memory device, the semiconductor memory device including a memory storing boot information and a controller comprising an error detection and/or correction (ECC) circuit, the method comprising; executing a bootloading operation cycle, wherein the bootloading operation cycle comprises; loading the boot information from the memory to the controller, performing an ECC operation on the boot information using the ECC circuit, and providing a fail condition indication or a pass condition indication in relation to the ECC operation, and if the fail condition indication is provided, executing a next bootloading operation cycle.

In another embodiment, the invention provides a memory system comprising; a flash memory configured to store boot information, and a controller comprising an error detection and/or correction (ECC) circuit and being configured to execute a bootloading operation, wherein the bootloading operation comprises at least one bootloading operation cycle, and each bootloading operation cycle comprises loading the boot information from the memory and thereafter performing an ECC operation in the ECC circuit in relation to the loaded boot information, wherein the controller is further configured to execute a next bootloading operation cycle if the ECC operation indicates a fail condition for the loaded boot information and terminate the bootloading operation if the ECC operation indicates a pass condition for the loaded boot information; and a central processing unit (CPU) performing a boot operation once the ECC operation indicates a pass condition for the loaded boot information.

DESCRIPTION OF EMBODIMENTS

Embodiments of the invention will now be described in some additional detail with reference to the accompanying drawings. However, the invention may be variously embodied and should not be construed as being limited to only the illustrated embodiments.

Figure 1:
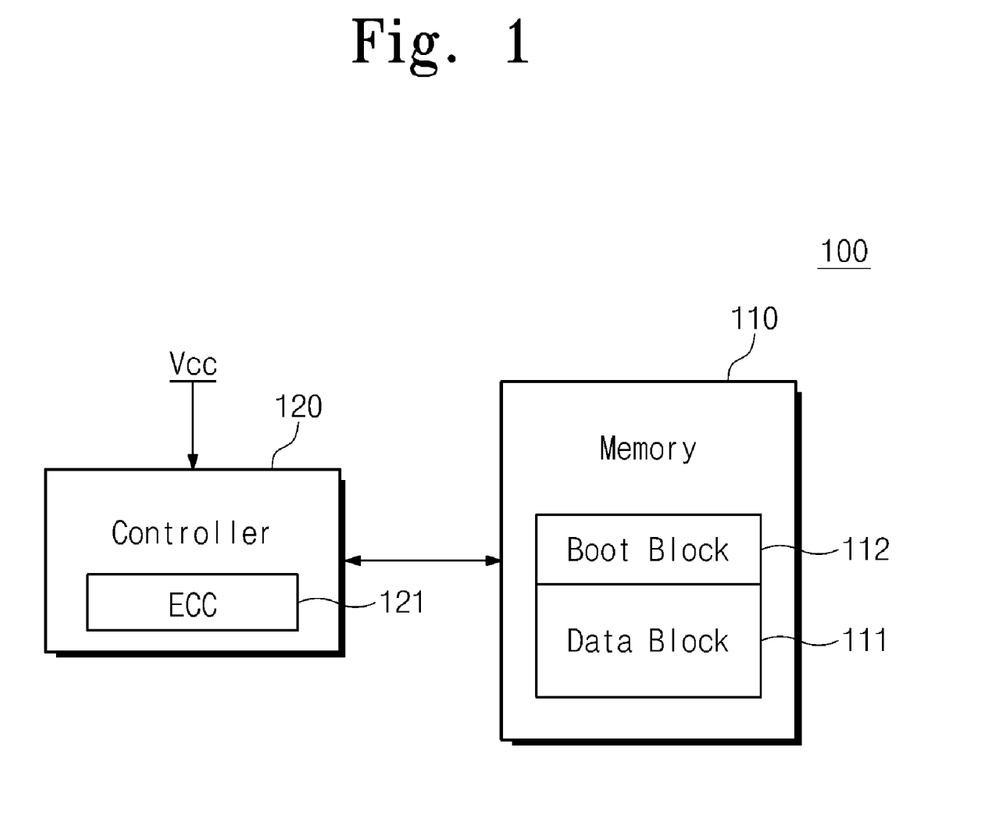
FIG. 1 is a block diagram of a semiconductor memory device according to an embodiment of the invention.

FIG. 1 is a block diagram of a semiconductor memory device according to an embodiment of the invention. Referring to FIG. 1, a semiconductor memory device 100 comprises a memory 110 and a controller 120. In one aspect, embodiments of the invention are characterized by the ability to safely load boot information from memory 110 as an applied power supply voltage Vcc is being brought up. The phrase "being brought up" refers to the conventionally understood process of generating a voltage (here, the system power supply voltage) at a defined level. That is, the voltage generation circuitry within a semiconductor device can not instantaneously bring up a desired voltage from 0 volts. The period of time required to bring up the voltage is referred to as a "bring up period".

The memory 110 illustrated in FIG. 1 comprises a data block 111 and a boot block 112. General user data is stored in the data block 111 and boot information is stored in the boot block 112. The boot information (data and/or code) stored in boot block 112 may take many different forms, but at a minimum some quantity of boot information must be safely loaded from memory during a system power up before the constituent memory system will operate properly.

Hence, the controller 120 loads boot information stored in the memory 110 during power up. The controller 120 comprises an error correction code (ECC) circuit 121 capable of performing an error detection and/or correction (ECC) operation in relation to boot information loaded from memory. A bootloading operation according to certain embodiments of the invention may include a number of conditionally performed cycles. That is, if an error (or fail condition) is detected by the ECC operation during an initial (or current) bootloading operation cycle, the controller 120 executes another bootloading operation cycle and corresponding ECC operation. Only after the ECC operation passes the loaded boot information, will the controller 120 terminate the bootloading operation.

As noted above, the term "boot information" should be broadly construed and will vary with system and application. Boot information may include all (or any portion of) data, such as the system operating system (OS) program and a basic input/output system (BIOS) program. Various initialization functions are executed in relation to the boot information, such as register initialization, power-on self-test (POST) routines associated with certain peripheral devices, system setting indication routines, etc.

In FIG. 1, the memory 110 may be a flash memory. In this case, the flash memory 110 and the controller 120 may be integrated into one single chip. The single chip may be realized using oneNAND™ technology. Alternately, the ECC circuit 121 may be provided external to memory controller 120, such as within flash memory 110.

Figure 2:
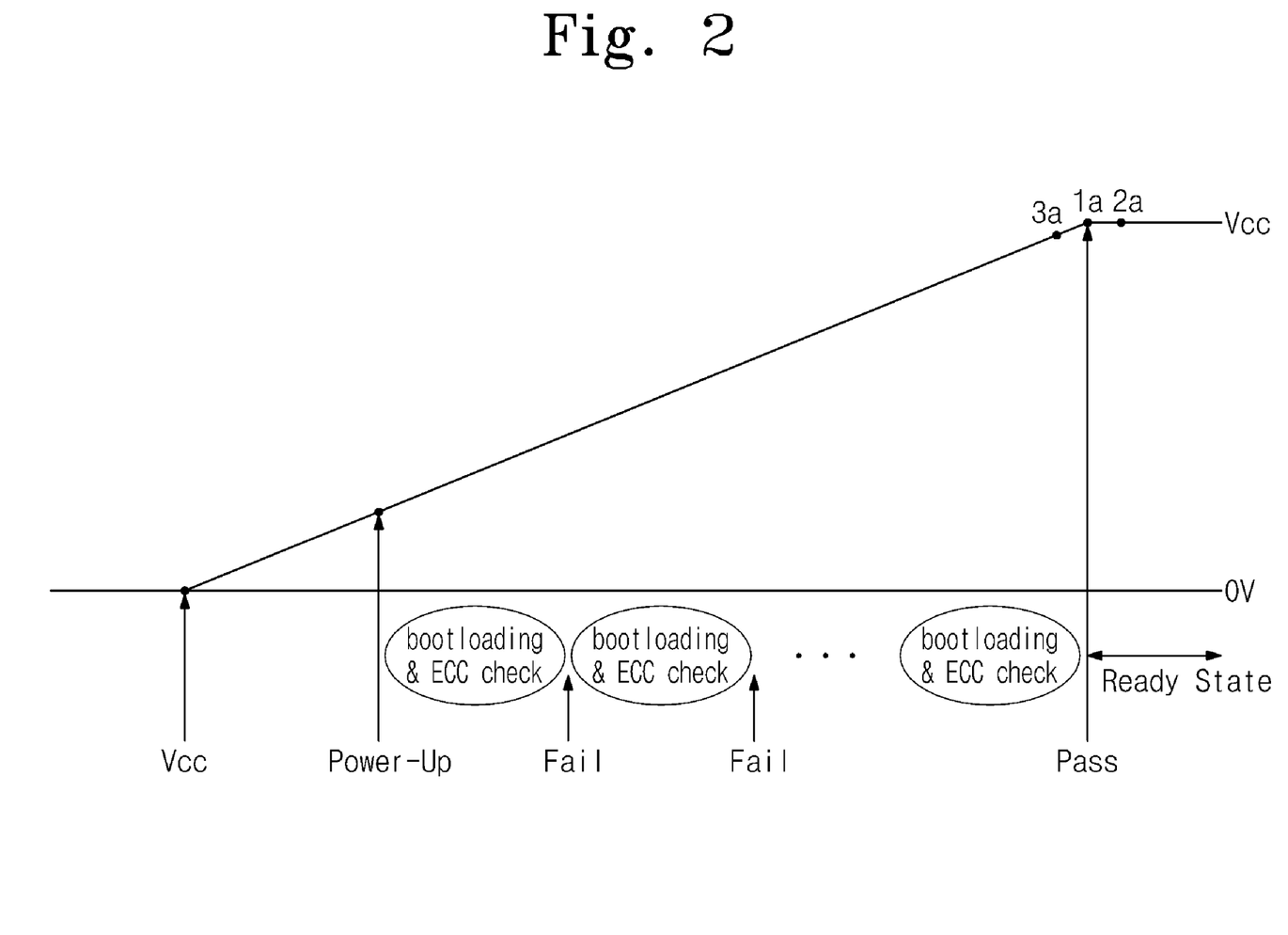
FIG. 2 is a conceptual diagram illustrating a bootloading operation associated with the semiconductor memory device of FIG. 1.

FIG. 2 is a conceptual diagram illustrating a cyclically performed bootloading operation that is executed as power supply voltage Vcc is being brought up from an initial level of 0V to a defined level of Vcc. This type of bootloading operation may be performed in semiconductor memory device 100 of FIG. 1 under the control of the controller 120. Referring to FIG. 2, a power-up indication is received by controller 120 as soon as the power supply voltage Vcc begins being brought up (e.g., a charge pump circuit or other voltage source external to controller 120 begins operation). As soon as the power-up indication is received, the controller 120 initiates a first bootloading operation cycle directed to the boot information stored in the boot block 112. Each bootloading operation cycle includes loading (i.e., reading and transferring) the boot information from the memory 110 to the memory controller 120, and then performing an ECC operation of the loaded boot information. Should the first and any subsequent bootloading operation cycle fail (i.e., an error or an uncorrectable error is detected in the loaded boot information) a next bootloading cycle is performed.

In this context, the constituent ECC operation executed by ECC circuit 121 in the memory controller 120 may be a simple error detection routine (e.g., a parity bit check) and/or a sophisticated error detection and correction routine capable of not only detecting errors in the loaded boot information, but also corrected certain correctable errors. In the later case, only uncorrectable errors (i.e., errors beyond the ECC operations correction capabilities) will generate a fail result for the current bootloading operation.

In the illustrated example of FIG. 2, it is assumed that a successful (pass) bootloading operation cycle occurs (at time 3a) only as the power supply voltage Vcc rises to a level very close to the desired level of Vcc. Thus, at time 1a a pass indication is received from ECC circuit 121, as power supply voltage Vcc enters a ready state (time 2a). Upon receiving the pass indication at time t1, the memory controller 120 terminates the bootloading operation and may begin executing initialization routines in relation to the "passed" (i.e., successfully loaded and ECC verified) boot information.

It should be noted that the example illustrated in FIG. 2 is a worst case of sorts, wherein power supply voltage Vcc must be completely brought up before the boot information can be successfully loaded. More typically, a lesser level or minimally acceptable level for the power supply voltage Vcc below the full swing level of Vcc may be sufficient to enable a successful execution of the bootloading operation.

Figure 3:
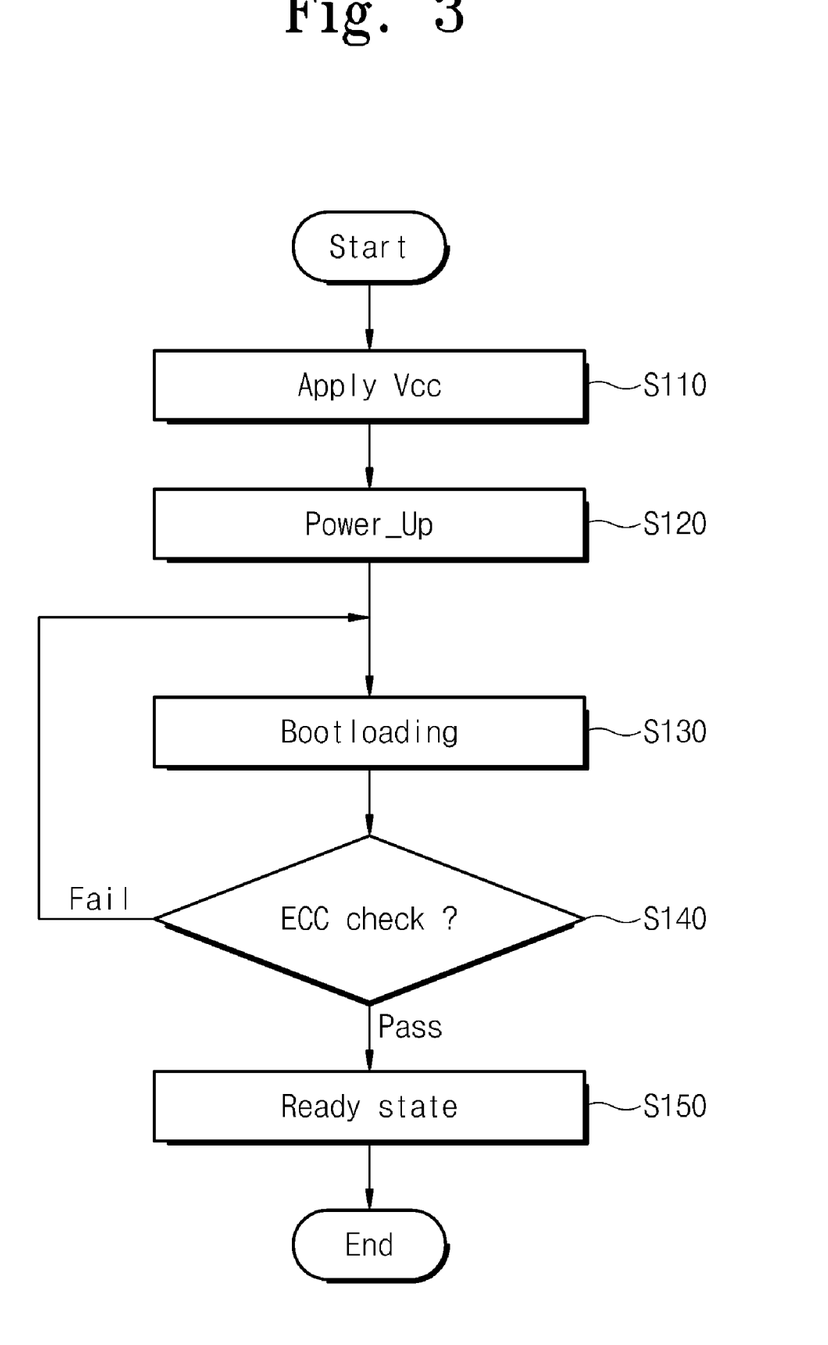
FIG. 3 is a flowchart summarizing a bootloading method associated with the semiconductor memory device of FIG. 1.

FIG. 3 is a flowchart summarizing a bootloading method according to an embodiment of the invention and may be executed with semiconductor memory device 100 of FIG. 1.

First, the power supply voltage Vcc begins the process of being brought-up and applied within semiconductor memory device 100 (S110). Once the power supply voltage Vcc begins being brought up (or is initially applied), a power-up indication is provided to memory control 120 (S120). The power-up indication may be generated by, for example, a system initialization circuit such as a power on reset (POR) circuit or another circuit external to controller 120 providing power supply voltage Vcc. Upon receiving the power-up indication, memory controller 120 begins a bootloading operation by executing a first boot information load operation followed by a first ECC operation (S130). The ECC circuit 121 in memory controller 120 performs the ECC operation on the loaded boot information and yields a pass/fail result (S140). If the ECC indicates a fail condition (i.e., a detected error or a detected uncorrectable error), the bootloading operation repeats (i.e., executes a next bootloading operation cycle as the power supply voltage Vcc continues to be brought up). Only after receiving a pass indication from the ECC operation will a ready state be indicated and the bootloading operation terminated (S150).

Figure 4:
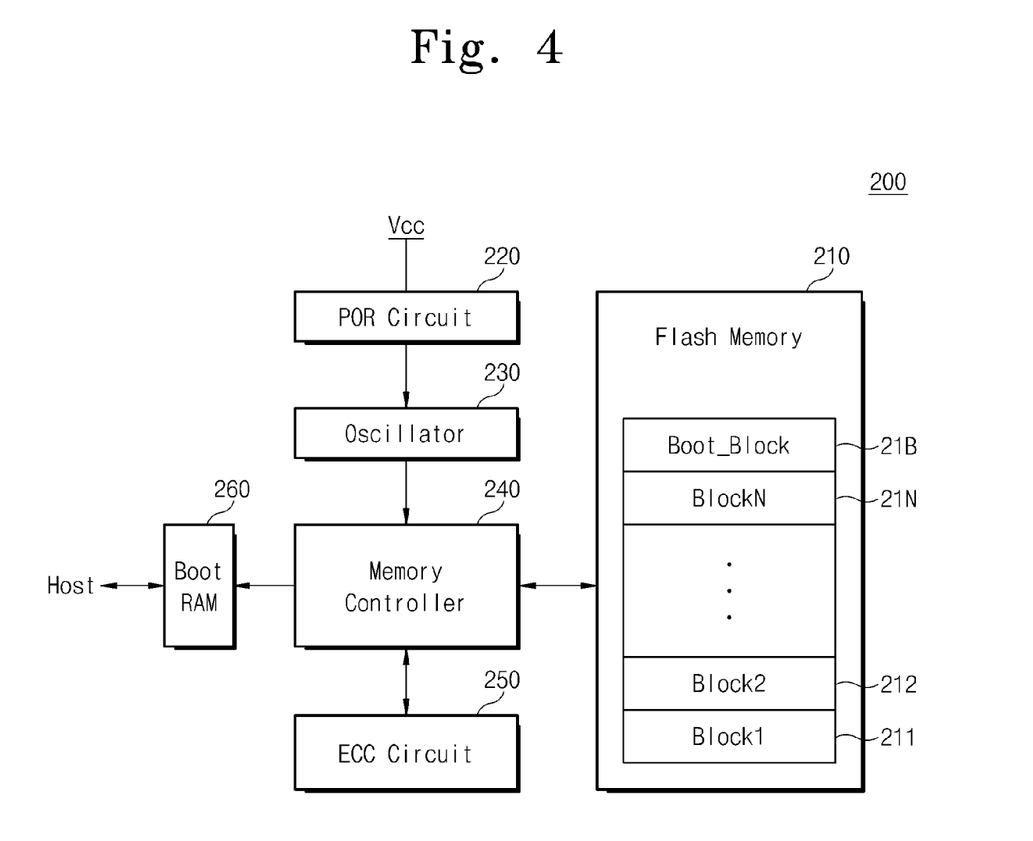
FIG. 4 is a block diagram of a semiconductor memory device according to another embodiment of the invention.

FIG. 4 is a block diagram of a semiconductor memory device according to another embodiment of the invention. Referring to FIG. 4, the semiconductor memory device 200 comprises a flash memory 210, a POR circuit 220, an oscillator 230, an ECC circuit 240, a memory controller 250, and a boot RAM 260. The illustrated embodiment is capable of loading boot information stored in the flash memory 210 while the power supply voltage Vcc is being brought up.

The flash memory 210 includes a plurality of data blocks 211 to 21N and a boot block 21B. General user data are stored in the data blocks 211 to 21N, and boot information associated with a boot operation is stored in the boot block 21B.

The POR circuit 220 generates a reset signal indicating stable operating conditions for the memory system upon power-up. In the illustrated embodiment of FIG. 4, a power-up indication form beginning the bootloading operation may be generated in relation to a reset signal generated in a system initialization circuit such as the POR circuit 220. Generally, a memory system generates a reset signal during an initial state for a stable operation, and is designed to normally operate after the reset signal is applied to the memory system.

If the memory system includes a filter or a flip-flop, it is impossible to predict an initial state. Therefore, if the memory system operates as it is without resetting itself, an error may occur such that it may be difficult to execute various operations that a user wants. This reset signal can be generated after a power supply voltage Vcc is applied and a predetermined time elapses through an additional pin that allows an external input. Additionally, a reset signal may be automatically generated when a power supply voltage Vcc is applied through a system initialization circuit such as the POR circuit 220 within a memory system.

The oscillator 230 delays execution of the bootloading operation following power-up by a defined delay period. This execution delay for the bootloading operation following receipt of a power-up indication recognizes the typical circumstance wherein at least one to several hundreds of μseconds is required until the power supply voltage Vcc is fully brought up to its defined operating level (i.e., undergoes a full voltage swing from 0V). The bootloading operation is delayed by the oscillator 230, such that some minimum timing margin following system power-up and the generation and/or provision of the power supply voltage Vcc necessary to properly perform the bootloading operation is obtained. The bootloading operation delay period may be defined in relation to a number of factors including system type, available power generation capabilities, etc.

Following the bootloading operation delay period, the memory controller 240 loads (or attempts to load) the boot information from boot block 21B to the boot RAM 260. The ECC circuit 250 performs an ECC operation in relation to the boot information loaded by the memory controller 240. If a fail condition is indicated by ECC operation, another bootloading operation cycle may be performed. Once a pass condition is indicted by the ECC operation, the bootloading operation is terminated, and the boot information stored in boot RAM 260 may be used with a high degree of confidence by a host (not shown) during a ready state to perform a boot operation for the memory system.

Figure 5:
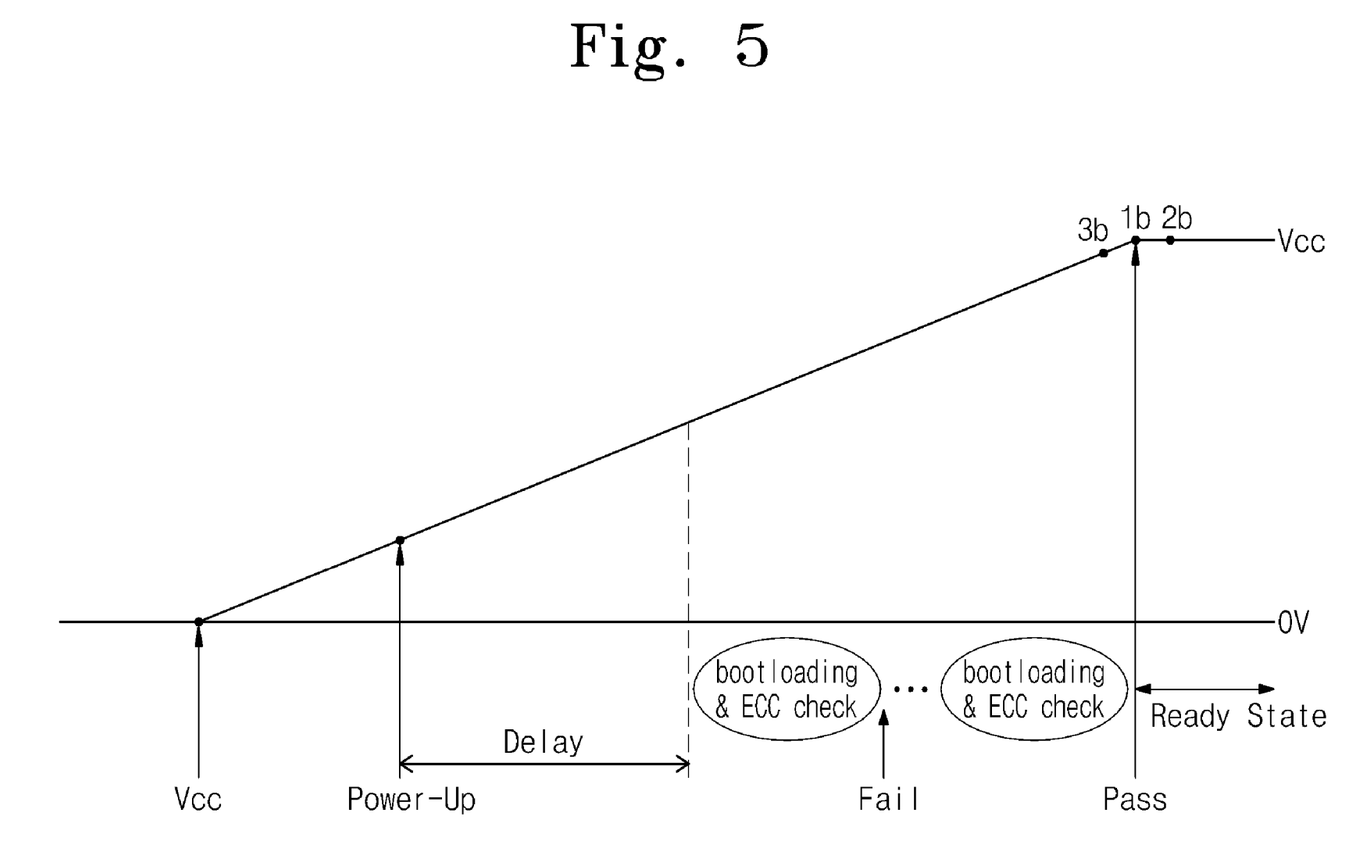
FIG. 5 is a conceptual diagram illustrating a bootloading operation associated with the semiconductor memory device of FIG. 4.

FIG. 5 is a conceptual diagram for illustrating a bootloading operation of the semiconductor memory device 200 of FIG. 4. Referring to FIG. 5, the semiconductor memory device 200 begins executing bootloading operation cycles following the bootloading operation delay period (e.g., about 200 to 300 μsec from the power-up indication). As before, each bootloading operation cycle includes a boot information load operation followed by an ECC operation.

Similar to FIG. 2, reference numerals 1b, 2b, and 3b of FIG. 5 indicate a state in which the boot operation for the memory system enters a ready state. The semiconductor memory device 200 may enter the ready state if the ECC operation returns a pass indication when the power supply voltage Vcc is full swing 1b, before a power supply voltage Vcc achieves full swing 3b, or after a power supply voltage Vcc achieves full swing 2b.

Figure 6:
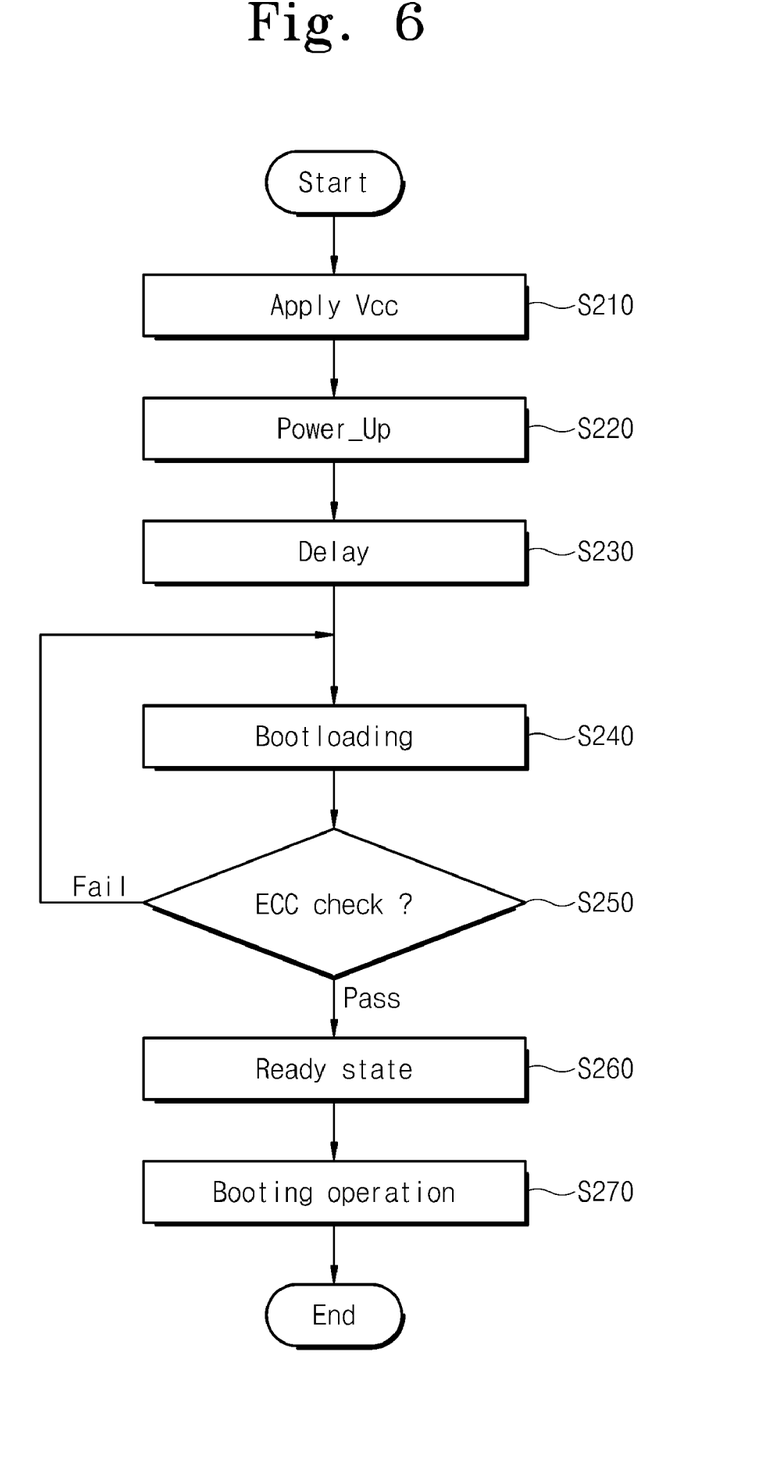
FIG. 6 is a flowchart summarizing a bootloading method associated with the semiconductor memory device of FIG. 4.

FIG. 6 is a flowchart summarizing a bootloading method for the semiconductor memory device 200 of FIG. 4.

Referring to FIGS. 4 through 6, the bootloading method for the semiconductor memory device 200 begins with bringing up a power supply voltage Vcc and/or applying same to to the semiconductor memory device 200 (S210). After the semiconductor memory device 200 is powered up as indicated by operation of the POR circuit 220 (S220), the oscillator 230 delays the bootloading operation for a predetermined bootloading operation delay period (S230). Then, the memory controller 240 loads the boot information from the boot block 21B of the flash memory 210 (S240). The ECC circuit 250 then performs the EEC operation on the loaded boot information (S250). If the ECC operation indicates a fail condition, another bootloading operation cycle is executed (S240). However, if the ECC operation indicates a pass condition, the semiconductor memory device 200 terminates the bootloading operation and enters the ready state (S260). An associated host may then perform a boot operation by using the boot information stored in the boot RAM 260.

Referring to FIG. 4, after a power supply voltage Vcc is applied and a predetermined delay time elapses, a bootloading operation and an error detection operation repeat for stably loading a boot code. According to the present invention, this is for preventing a boot operation of a memory system from proceeding before a power supply voltage Vcc achieves a full swing.

In FIG. 4, flash memory 210, POR circuit 220, oscillator 230, memory controller 240, ECC circuit 250, and boot RAM 260 may be integrated onto one single integrated circuit die (or chip). The single chip may be realized using conventionally understood oneNAND™ fabrication technology. Other embodiments of the invention may provide the ECC circuit 250 external to the memory controller 240, such as within the flash memory 210.

Figure 7:
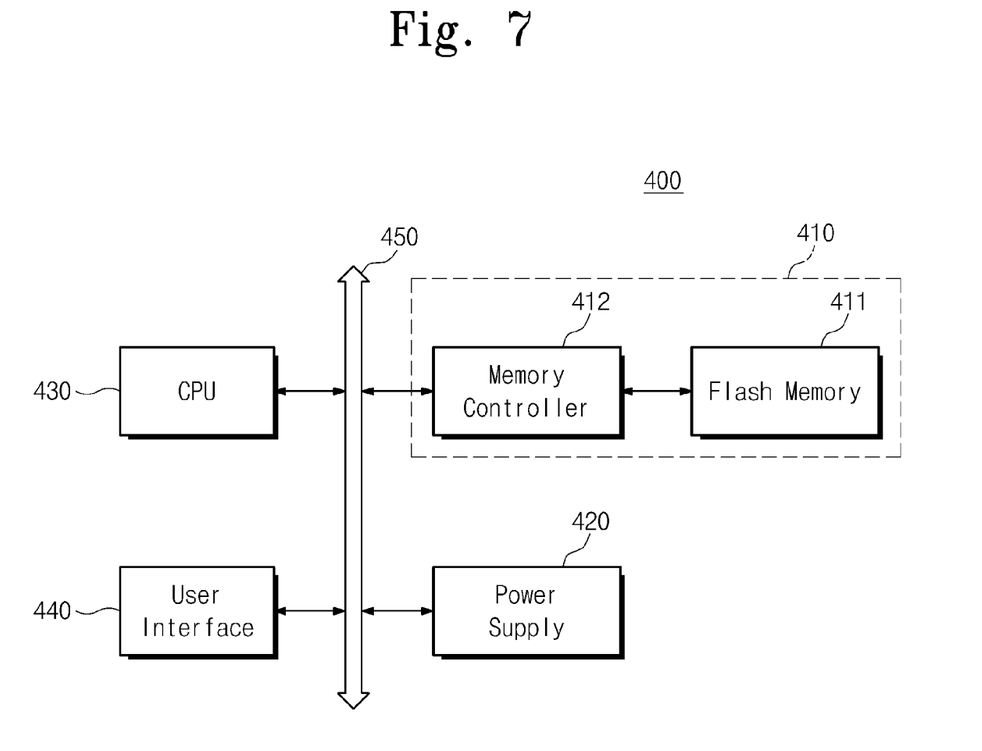
FIG. 7 is a block diagram of a memory system according to an embodiment of the invention.

FIG. 7 is a block diagram of a memory system according to an embodiment of the invention. Referring to FIG. 7, a memory system 400 comprises a semiconductor memory device 410, a power supply device 420, a central processing unit (CPU) 430, a user interface 440, and a system bus 450.

The semiconductor memory device 410 includes a flash memory 411 and a memory controller 412. The flash memory 411 stores boot information. The memory controller 412 performs the cyclic bootloading operation as described above, whereby the boot information stored in flash memory 411 is properly loaded during a power-up sequence. The CPU 430 performs a boot operation for the memory system 400 by using passed boot information. Within this illustrated embodiment, the semiconductor memory device 410 may be similar in circuit configuration and operation to the embodiments described in relation to FIG. 1 or FIG. 4.

As described above, embodiments of the invention utilizes an ECC operation and corresponding pass/fail indication during a memory system power-up sequence. A bootloading operation conducted during the power-up sequence may proceed by cycles is a fail condition is indicated for the loading requisite boot information. Only after the ECC operation passes the loaded boot information will a boot operation be run using same.

The flash memory device and/or the memory controller in embodiments of the present invention may be mounted using various packaging types. Examples of the such packages include; package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), wafer-level processed stack package (WSP), etc.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A semiconductor memory device comprising:
a memory configured to store boot information; and
a controller comprising an error detection and/or correction (ECC) circuit and being configured to execute a bootloading operation during a power supply voltage bring up period of a voltage powering the controller, wherein the bootloading operation comprises at least one bootloading operation cycle, and each bootloading operation cycle comprises loading the boot information from the memory and thereafter performing an ECC operation using the ECC circuit in relation to the loaded boot information,
wherein the controller is further configured to execute a next bootloading operation cycle if the ECC operation indicates a fail condition for the loaded boot information.

2. The semiconductor memory device of claim 1, wherein the power supply voltage bring up period begins upon receiving in the memory a power-up indication and ends when a power supply voltage applied to the semiconductor memory device is fully brought up to a defined ready state level.

3. The semiconductor memory device of claim 2, further comprising:
a delay circuit configured to define a bootloading operation delay period, wherein the memory controller is further configured to begin execution of an initial bootloading operation cycle after receiving the power-up indication and then following the bootloading operation delay period.

4. The semiconductor memory device of claim 3, wherein the delay circuit is an oscillator.

5. The semiconductor memory device of claim 3, further comprising:
a power-on-reset circuit configured to generate the power-up indication after initially receiving the power supply voltage.

6. The semiconductor memory device of claim 1, wherein the memory is a flash memory.

7. The semiconductor memory device of claim 6, wherein the flash memory and the controller are integrated into one single integrated circuit chip.

8. The semiconductor memory device of claim 1, further comprising:
a boot RAM configured to store the loaded boot information.

9. A method of executing a bootloading operation in a memory system including a semiconductor memory device, the semiconductor memory device including a memory storing boot information and a controller comprising an error detection and/or correction (ECC) circuit, the method comprising:
cyclically executing a bootloading operation cycle during a power supply voltage bring up period of a voltage powering the controller, wherein each cycle of the bootloading operation comprises:
loading the boot information from the memory to the controller;
performing an ECC operation on the boot information using the ECC circuit; and
providing a fail condition indication or a pass condition indication in relation to the ECC operation; and
if the fail condition indication is provided, executing a next cycle of the bootloading operation.

10. The method of claim 9, further comprising:
if the pass condition is provided, terminating the cyclical execution of the bootloading operation.

11. The method of claim 10, further comprising:
after terminating the cyclical execution of the bootloading operation, performing a boot operation for the memory system.

12. The method of claim 9, further comprising:
delaying a first execution of the bootloading operation by a predetermined bootloading operation delay period.

13. The method of claim 9, further comprising:
receiving a power-up indication upon initially receiving a power supply voltage in the semiconductor memory device; and
delaying a first execution of the bootloading operation after receiving the power-up indication until a bootloading operation delay period has lapsed.

14. The method of claim 9, wherein the semiconductor memory device is a flash memory and the memory system is integrated onto a single integrated circuit chip.

15. A memory system comprising:
a flash memory configured to store boot information; and
a memory controller comprising an error detection and/or correction (ECC) circuit and being configured to execute a bootloading operation during a power supply voltage bring up period of a voltage powering the controller, wherein the bootloading operation comprises at least one bootloading operation cycle, and each bootloading operation cycle comprises loading the boot information from the memory and thereafter performing an ECC operation using the ECC circuit in relation to the loaded boot information, wherein the controller is further configured to execute a next bootloading operation cycle if the ECC operation indicates a fail condition for the loaded boot information and terminates the bootloading operation if the ECC operation indicates a pass condition for the loaded boot information; and
a central processing unit (CPU) configured to perform a boot operation after the ECC operation indicates a pass condition for the loaded boot information.

16. The memory system of claim 15, wherein execution of the power supply voltage bring up period begins upon initially receiving in the flash memory a power-up indication and ends when a power supply voltage applied to the memory system is fully brought up to a defined ready state level.

17. The memory system of claim 15, wherein the flash memory and the memory controller are integrated into a single integrated circuit chip.

18. The memory system of claim 15, further comprising:
a boot RAM configured to store the loaded boot information.

* * * * *